May 7, 1968            D. PREGNO            3,381,709
DEVICES FOR DRAWING LIQUID FROM TANKS AND THE LIKE
Filed July 21, 1965
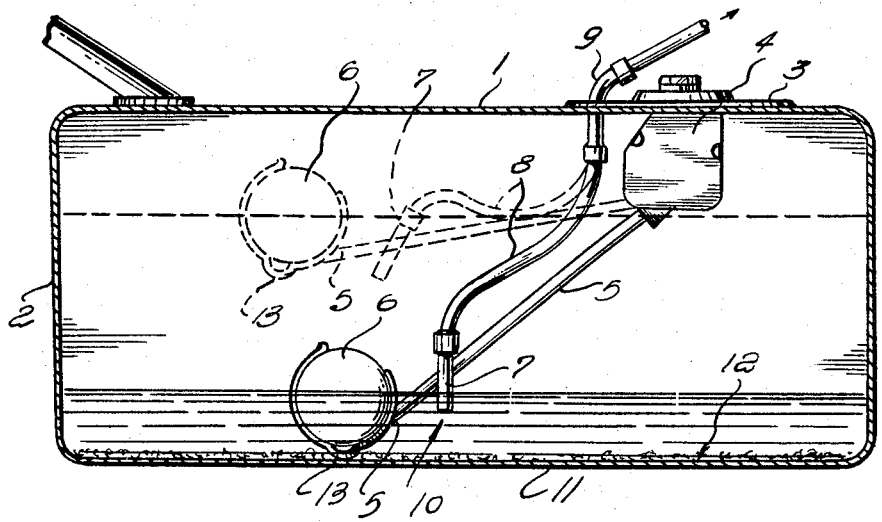
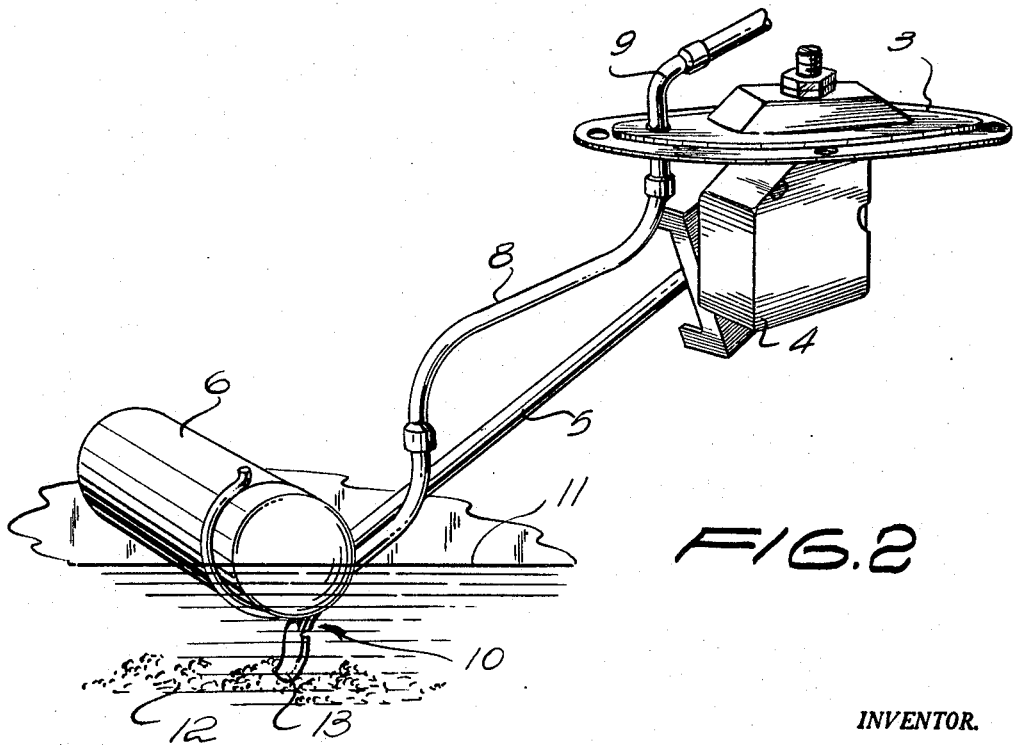
INVENTOR.
DARIO PREGNO
BY
ATTORNEYS 3,381,709
DEVICES FOR DRAWING LIQUID FROM
TANKS AND THE LIKE
Dario Pregno, Dr. Luis Belaustegui 1472,
Buenos Aires, Argentina
Filed July 21, 1965, Ser. No. 473,697
4 Claims. (Cl. 137—578)

ABSTRACT OF THE DISCLOSURE

In a fuel tank or the like having a mounting plate fixed in the top wall thereof, a liquid gauge depending from the mounting plate and including an elongated movable arm the free end of which is attached to a float; a liquid draw off conduit including a rigid outlet tube fixed in the plate, a rigid inlet nozzle fixed either to the arm or the float, a flexible hose interconnecting and communicating the outlet tube with the inlet nozzle, and a spacer which may be positioned either on the arm, inlet nozzle or float to engage the bottom of the tank and thereby insure that the inlet of the nozzle will always be spaced at least a predetermined distance above the bottom of the tank.

---

This invention relates to an improved device for drawing liquid from a tank or the like.

The liquid-drawing device with which the present invention is concerned is of the type comprising a tube extending from the interior of the tank through a wall thereof, to a liquid suctioning means.

In accordance with the improvements of this invention, the aforesaid tube comprises a first fixed section extending into the tank through an opening to the edges of which said section is fixed and a second movable constituted by a flexible tube secured to supporting means associated with a float, said movable section having a liquid inlet which is permanently spaced from the bottom of the tank.

The spacing between said liquid inlet and the bottom of the tank is variable and the minimum spacing is determined by the distance between two parallel planes, of which one contains the center of said inlet and the other contains the point capable of being determined by the contact between the bottom of the tank and the free end of a spacer or stop member associated with the tank float and capable of bearing against the bottom of the tank.

It will be readily understood from the above that the main object of the improved device of this invention is to stop the liquid inlet of the suction tube from getting too close to the bottom of the tank, thus preventing the liquid-suctioning means from drawing therewith any solid particles, sludge or other foreign matter which may have settled on the bottom of the liquid container.

The device of the present invention is particularly applicable to fuel tanks, either at filling stations or in automotive vehicles. The features of the invention will insure that the fuel purchased at a filling station the fuel tanks of which are provided with the device in question, will be substantially free of impurities. However, should any impurities or foreign matter reach the automotive vehicle fuel tank along with the fuel from tanks not provided with the device, such foreign matter will not be able to clog the carburetor if said vehicle fuel tank is equipped with the device of this invention.

The device of this invention may also find advantageous use in tanks for edible liquids such as oils, wines, fruit juices and the like.

In order that the invention may be more clearly understood and readily carried into practice, two of the preferred embodiments thereof have been illustrated by way of example in the accompanying drawings, in which:

FIG. 1 is a longitudinal sectional elevational view of a tank including a liquid gauge device combined with the device of the present invention; and FIG. 2 is a fragmentary perspective view, in an enlarged scale, of a somewhat modified embodiment of the invention.

The same reference characters are used to indicate like or corresponding parts throughout the drawings.

Referring first to FIG. 1, the device of this invention is shown in connection with a tank 2, the top wall 1 of which has connected thereto a plate member 3 of a liquid gauge device, the mechanism of said gauge being contained in a housing 4 secured to the underside of said plate member 3. The control means of said gauge device is an angularly movable arm 5 extending therefrom and having a float 6 fixed to the free end thereof, said float determining the angular movements of said arm 5.

At a position near the float 6, said arm 5 has fixed thereto a rigid nozzle 7 to which there is connected one end of a flexible tube 8 the opposite end of which is connected to a rigid tube section 9 extending through a hole in said plate 3. Said rigid tube section 9 sealed as by welding to the edges of said plate hole, thus remaining suitably fixed to the plate 3 which is in turn suitable adapted in an opening provided in the top wall of the tank 2. Said tube section 9 extends to pumping means, not shown.

FIG. 1 shows in dash-lines the position of the float 6, arm 5 and tube 7–8 when the tank 2 is almost full of liquid, and in full lines the position of said elements when the tank 2 is almost empty. It will be seen also that when the tank is almost empty, the inlet 10 of the nozzle 7 will remain spaced from the bottom 11 of the tank, thus preventing any dirt, sludge or the like 12 from being drawn out.

The spacing insuring that foreign matter will not be drawn out along with the liquid is caused by a projection 13 preferably provided on the float at a position opposed to the tank bottom 11.

FIG. 2 illustrates a modified embodiment wherein the spacer means 13 is not directly associated with the float 6 but is formed by a short closed-ended section of the nozzle 7 which at a certain distance from said closed end is formed with an inlet 10 spaced from the tank bottom 11.

It will be noted that in both embodiments of the invention the tube or nozzle 7 is fixed to the arm 5, but in other equally advantageous embodiments the tube or nozzle 7 is fixed to the float 6.

As regards the spacer member 13, in accordance with a modification which has not been illustrated, same may comprise a finger extending from the arm 5.

It will also be understood that while the improved device of the present invention has been described and illustrated as associated with a liquid gauge, such association is advantageous but not essential.

It is obvious that in carrying the invention into practice, many changes and/or modifications may occur to those skilled in the art without departing from the scope of the invention as clearly set forth in the appended claims.

What is claimed is:

1. In a tank or the like including a plurality of walls enclosing a space for receiving a liquid, a mounting plate fixed to one of the walls, a liquid gauge device depending from the mounting plate and having an elongated movable arm extending in the tank, and a float fixed to the arm to be movable in accordance with the level of the liquid in the tank; a device for drawing liquid from the tank including a rigid outlet tube fixed in said plate and having a first portion located externally of the plate and having a second portion located in the tank, a rigid inlet nozzle fixed with respect to one of said arm and float and having an inlet end adapted to receive liquid in the tank, a flexible tube interconnecting and communicating the inlet nozzle and the outlet tube to convey liquid from the inlet nozzle to the outlet tube for conveyance out of the tank, and a spacer means located on one of said float, arm, and inlet nozzle below the level of the inlet end of the nozzle to be engageable with the bottom of the tank to insure that the inlet end of the nozzle is always spaced at least a minimum distance above the bottom of the tank.

2. The device defined in claim 1 wherein said spacer means includes a finger member depending downwardly from said float.

3. The device defined in claim 1 wherein said spacer means includes a finger depending downwardly from said arm.

4. The device defined in claim 1 wherein said inlet nozzle has a closed end portion projecting downwardly beyond said inlet there of and thereby constituting said spacer means.

References Cited

UNITED STATES PATENTS

| | | | |
|---|---|---|---|
| 769,972 | 9/1904 | Wiles | 137—578 |
| 2,840,147 | 6/1958 | Almestad | 137—558 |

FOREIGN PATENTS

| | | |
|---|---|---|
| 161,308 | 4/1921 | Great Britain. |
| 962,404 | 7/1964 | Great Britain. |

M. CARY NELSON, *Primary Examiner.*

W. R. CLINE, *Assistant Examiner.*